United States Patent
Schantz et al.

(12) 
(10) Patent No.: US 6,774,859 B2
(45) Date of Patent: Aug. 10, 2004

(54) ULTRA WIDEBAND ANTENNA HAVING FREQUENCY SELECTIVITY

(75) Inventors: Hans G. Schantz, Huntsville, AL (US); Glenn P. Wolenec, Madison, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 10/077,340

(22) Filed: Jun. 1, 2002

(65) Prior Publication Data

US 2003/0090436 A1 May 15, 2003

Related U.S. Application Data

(60) Provisional application No. 60/333,044, filed on Nov. 13, 2001.

(51) Int. Cl.[7] .............................................. H01Q 11/12
(52) U.S. Cl. ...................... 343/742; 343/741; 343/866
(58) Field of Search .......................... 343/700 MS, 742, 343/866, 867, 741, 795

(56) References Cited

U.S. PATENT DOCUMENTS

| | | | |
|---|---|---|---|
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,363,108 A | 11/1994 | Fullerton | 342/27 |
| 5,677,927 A | 10/1997 | Fullerton et al. | 375/200 |
| 5,687,169 A | 11/1997 | Fullerton | 370/324 |
| 5,832,035 A | 11/1998 | Fullerton | 375/210 |
| 6,147,655 A * | 11/2000 | Roesner | 343/741 |
| 6,570,541 B2 * | 5/2003 | Dettloff | 343/742 |

* cited by examiner

Primary Examiner—James Vannucci
(74) Attorney, Agent, or Firm—Law Office of Donald D. Mondul

(57) ABSTRACT

An electromagnetic antenna apparatus exhibits a generally continuous signal response between a first frequency and a second frequency, and further exhibits a deviation from the signal response in a frequency region centered substantially at a selected frequency between the first frequency and the second frequency. The apparatus includes: (a) an antenna transceiving element; (b) a feed structure coupled with the antenna receiving element for communicating transceiving signals with the antenna transceiving element; and (c) a discontinuity structure in the antenna transceiving element coupled with the feed structure. The discontinuity structure is configured for effecting return of selected transceiving signals to the feed structure as return signals. The return signals effect the deviation.

22 Claims, 20 Drawing Sheets

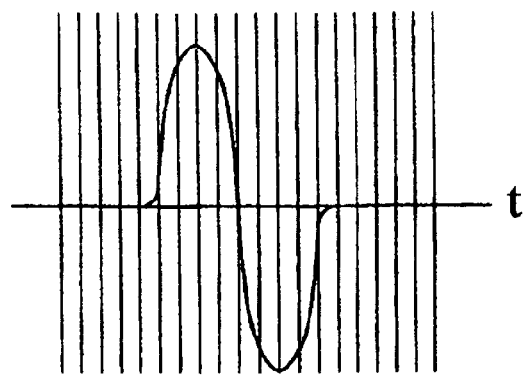
FIG. 8A
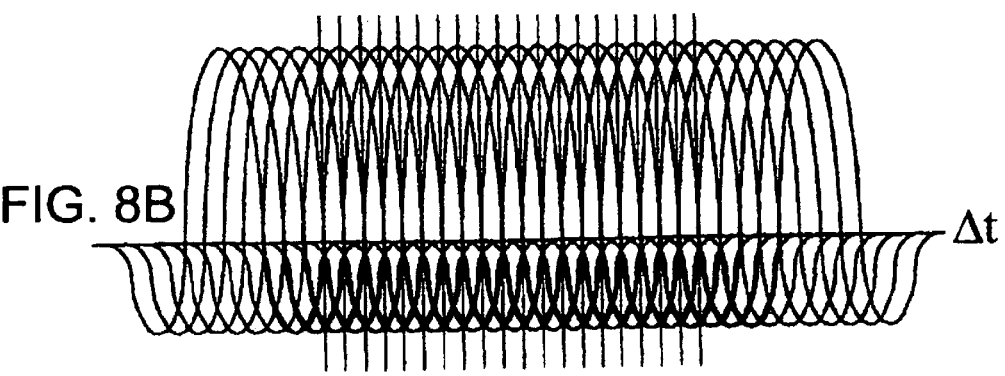
FIG. 8B
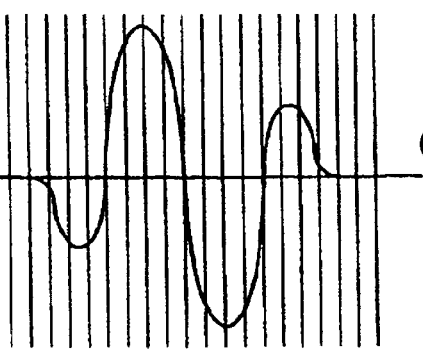
FIG. 8C   Corresponding to each Δt

ULTRA WIDEBAND ANTENNA HAVING FREQUENCY SELECTIVITY

This application claims benefit of prior filed copending Provisional Patent Application Ser. No. 60/333,044, filed Nov. 13, 2001.

BACKGROUND OF THE INVENTION

1. Field of the Invention

The present invention relates generally to electromagnetic energy radiation and reception, and especially relates to electromagnetic energy radiation and reception effected using impulse radio energy. Still more particularly the present invention provides an antenna that exhibits a generally continuous signal response between a first frequency and a second frequency and further exhibits a deviation from the signal response substantially at a selected frequency between the first frequency and the second frequency.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

Antennas having ultra-wide band (UWB) properties are desired for a variety of applications, including impulse radio applications for communications, positioning, and other uses. Historically the principal use of UWB antennas has been in multi-band communication systems. Such multi-band communication systems require an ultra-wide band antenna that can handle narrow band signals at a variety of frequencies.

The recently emerging impulse radio communications technology often referred to as impulse radio has placed different, more stringent requirements on antenna performance. Impulse radio communication uses UWB signals, so an antenna for use in an impulse radio system must transmit or receive (or, transmit and receive) over all frequencies across an ultra-wide band at the same time. Thus, ultra-wide band impulse radio requires that an antenna performs well over ultra-wide bandwidths, and is also non-dispersive of those signals.

One solution applied to meeting the increasing commercial demand for multi-band systems has been to combine a variety of different narrow band operational modes in one antenna device. For example, a mobile phone may be provided with an antenna apparatus that can operate with cellular phone frequencies around 850 MHz, as well as operate with PCS (personal communication service) frequencies around 1900 MHz. For economic and cosmetic reasons (such as compact size), it is desirable that a multi-band device be provided with a single antenna that can function at potentially widely separated narrow bands of interest.

Widespread deployment of ultra wideband or "UWB" systems that use wide expanses of bandwidth in their operation, leaves the systems and apparatuses using such UWB antennas vulnerable to whatever narrowband sources of interference might co-exist in a given environment.

A variety of techniques have been used to create multi-band antennas in the past. One technique uses a tuned antenna that relies on a variable reactance, such as a variable capacitor or variable inductance, to create a resonance for making the antenna effective over a particular narrow band of interest. Even with the advent of more sophisticated micro-electro-mechanical systems (MEMS), such tuned antennas require a potentially complicated, expensive, and bulky tuning system that may not be commercially optimal.

Another technique has involved creating a single antenna that is responsive to multiple narrow bands of interest. Such an antenna is commonly constructed as a composite structure of narrow band resonant antenna sections that can operate in their respective corresponding narrow bands of interest.

An exemplary such prior art composite multi-band antenna may, for example, include an assembly of a variety of narrowband structures, such as a low band structure having a spectral response that is resonant around a first center frequency $f_A$, a mid-band structure having a spectral response that is resonant around a second center frequency $f_C$, and a high-band structure having a spectral response that is resonant around a third center frequency $f_E$. The respective center frequencies $f_A$, $f_C$, $f_E$ are established according to the relationship:

$f_A < f_C < f_E$

Such a composite multi-band antenna has a spectral response that is resonant at a low frequency $f_A$, at a mid frequency $f_C$, and at a high frequency $f_E$. Such a composite multi-band antenna is preferably designed to be nonresponsive at a first boundary frequency $f_B$ between $f_A$ and $f_C$ and to be nonresponsive at a second boundary frequency $f_D$ between $f_C$ and $f_E$. Use of terms like "low," "mid," and "high," are for illustrative purposes only and should not be construed as referring to any particular range of frequencies. Similarly, although the hypothetical composite multi-band antenna is described as being responsive to three narrow bands, this does not preclude the present discussion from pertaining to dual band antennas, nor to antennas responsive to four or more bands.

The approach described above relating to constructing a composite antenna structure for establishing operational responsiveness in a plurality of narrow bands delineated by nonresponsive boundary frequencies within a wide band of frequencies is fraught with difficulties and disadvantages. Although the respective narrowband resonant structures may individually be quite responsive to their particular narrowband resonant frequencies of interest, when the various narrow band structures are combined together to form a composite multi-band antenna the performance of the respective narrowband resonant structures will inevitably degrade. Mutual coupling may be introduced between or among respective narrowband resonant structures that can cause spurious and undesired modes of operation as well as limit the performance of the desired modes of operation. Harmonic signals may be generated and various signals may interfere with each other to cancel or reinforce each other, all contributing to the degradation of integrity in effecting signaling. To some extent, such mutual coupling and interaction can be compensated for by methods known in the art involving combinations of filtering or amplifiers or other compensating circuitry. Radio frequency (RF) absorbing materials or shielding structures may also be employed in seeking to limit unwanted interaction of signals. In general, however, overall performance of such a composite multi-band antenna will suffer relative to the performance achievable from respective resonant component structures individually operating at their particular narrowband resonant frequencies of interest (e.g., $f_A$, $f_C$, $f_E$). A composite multi-band antenna is a case in which the whole is less than the sum of its parts.

Attempts have been made to create ultra wideband (UWB) antenna systems that are insensitive to particular frequencies. Such a frequency selective, or frequency-rejecting, UWB antenna system typically included a UWB antenna element connected via a transmission line to a frequency filter. In a typical example, a UWB antenna element has a frequency response sensitive across an ultra wideband range of frequencies from a first frequency $f_A$ to a second frequency $f_E$ that is higher than first frequency $f_A$. A frequency filter is provided for passing an ultra wideband range of frequencies from $f_A$ to $f_E$ with the exception of those frequencies in the vicinity of frequencies at which interference is to be avoided, such as a first intermediate frequency $f_B$ (between frequencies $f_A$, $f_C$) and a second intermediate frequency $f_D$ (between frequencies $f_C$, $f_E$). The frequency filter may be embodied in a discrete component filter, in a composite transmission line resonant filter, or in another RF filtering means known in the art. The resulting spectral response of such a frequency selective UWB antenna system is sensitive to an ultra wideband range of frequencies from $f_A$ to $f_E$ with the exception of frequencies in the vicinity of $f_B$ and $f_D$. Frequencies in the vicinity of $f_B$ and $f_D$ are "rejected" from the overall spectral response. That is, the antenna is significantly less responsive to signals at rejection frequencies $f_B$ and $f_D$ than to signals at other frequencies. Such a frequency selective UWB antenna system may be coupled via an output interface to an appropriate transmitter, receiver, or transceiver.

Whether an antenna structure is constructed for establishing operational responsiveness in a plurality of narrow bands within a wide band of frequencies or is constructed as a frequency selective UWB antenna system to attain similar operational characteristics, the overriding problems associated with prior art approaches result in bulky, complex and inefficient antenna structures.

It is desirable to have a UWB antenna system that is selectively insensitive to one or more narrow bands of interest. Such selective insensitivity may be advantageously established in order to avoid interference with certain particular frequencies within the UWB operating range of the antenna. For example, frequency rejection may be arranged to avoid interference with global positioning system (GPS) equipment or cellular telephone equipment. Preferably, a UWB antenna system is embodied in a single UWB antenna with a frequency sensitive response offering multi-band narrowband coverage, as well as an ultra wideband response with significantly lesser sensitivity of response to signals within particular narrow rejection frequency bands. In general, performance of a UWB system deteriorates with increasing number of rejection frequency bands, but a system designer may be able to accept one or perhaps two rejection frequency bands as part of an overall compatibility and interference strategy.

There is a need for a small ultra wideband antenna that is simple in construction yet can be made less responsive to signals within particular rejection frequency bands. In particular, there is a need for a small, simply constructed ultra wideband antenna that is efficient in operation as well as frequency selective.

SUMMARY OF THE INVENTION

An electromagnetic antenna apparatus exhibits a generally continuous signal response between a first frequency and a second frequency, and further exhibits a deviation from the signal response in a frequency region centered substantially at a selected frequency between the first frequency and the second frequency. The apparatus includes: (a) an antenna transceiving element; (b) a feed structure coupled with the antenna receiving element for communicating transceiving signals with the antenna transceiving element; and (c) a discontinuity structure in the antenna transceiving element coupled with the feed structure. The discontinuity structure is configured for effecting return of selected transceiving signals to the feed structure as return signals. The return signals effect the deviation.

It is therefore an object of the present invention to provide an electromagnetic antenna apparatus that exhibits a generally continuous signal response between a first frequency and a second frequency, that further exhibits a deviation from the signal response in a frequency region centered substantially at a selected frequency between the first frequency and the second frequency, and that is small, simply constructed and efficient in operation.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B

DETAILED DESCRIPTION OF THE EMBODIMENTS

Overview of the Invention

Figure 1A:
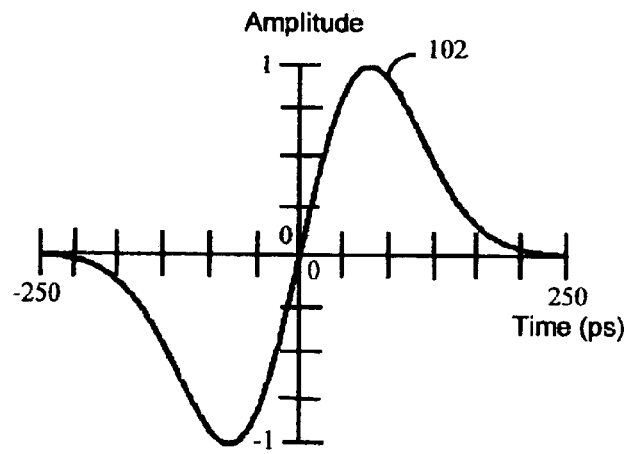
FIG. 1A illustrates a representative Gaussian Monocycle waveform in the time domain.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1B:
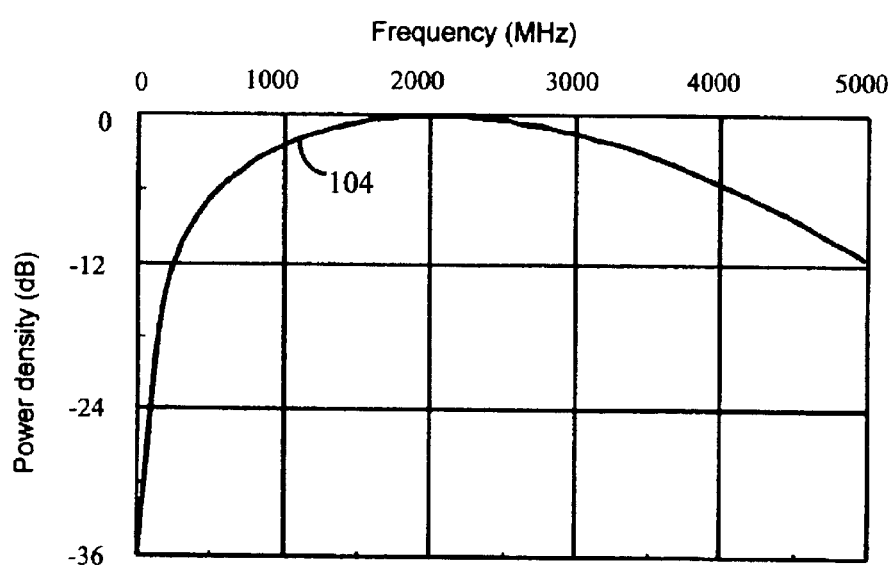
FIG. 1B illustrates the frequency domain amplitude of the Gaussian Monocycle of FIG. 1A.

The frequency domain spectrum of the above waveform is shown in FIG. 1B. The corresponding equation is:

$$F_{mono}(f) = (2\pi)^{\frac{3}{2}} \sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2A:
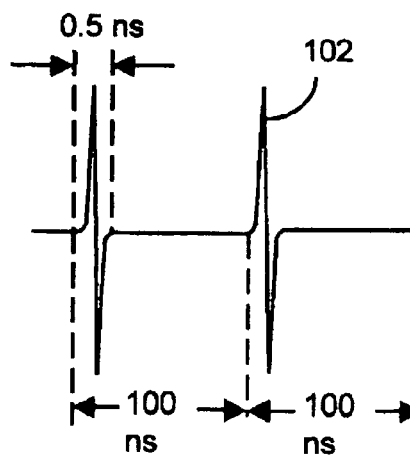
FIG. 2A illustrates a pulse train comprising pulses as in FIG. 1A.
Figure 2B:
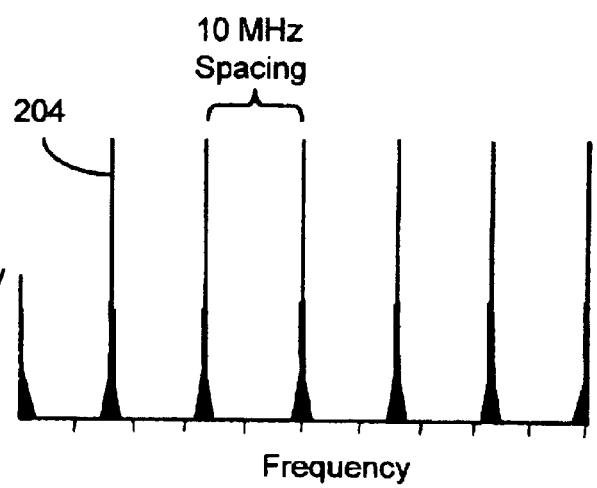
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
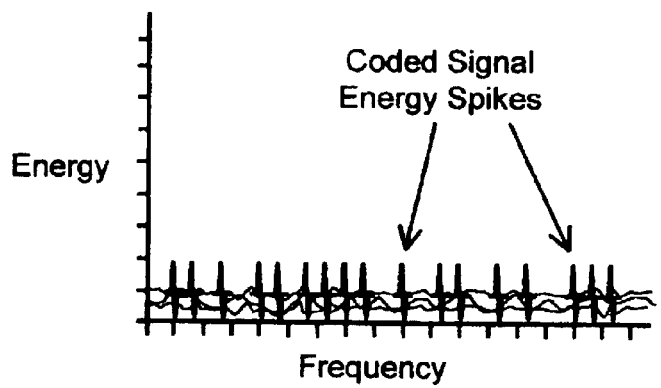
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
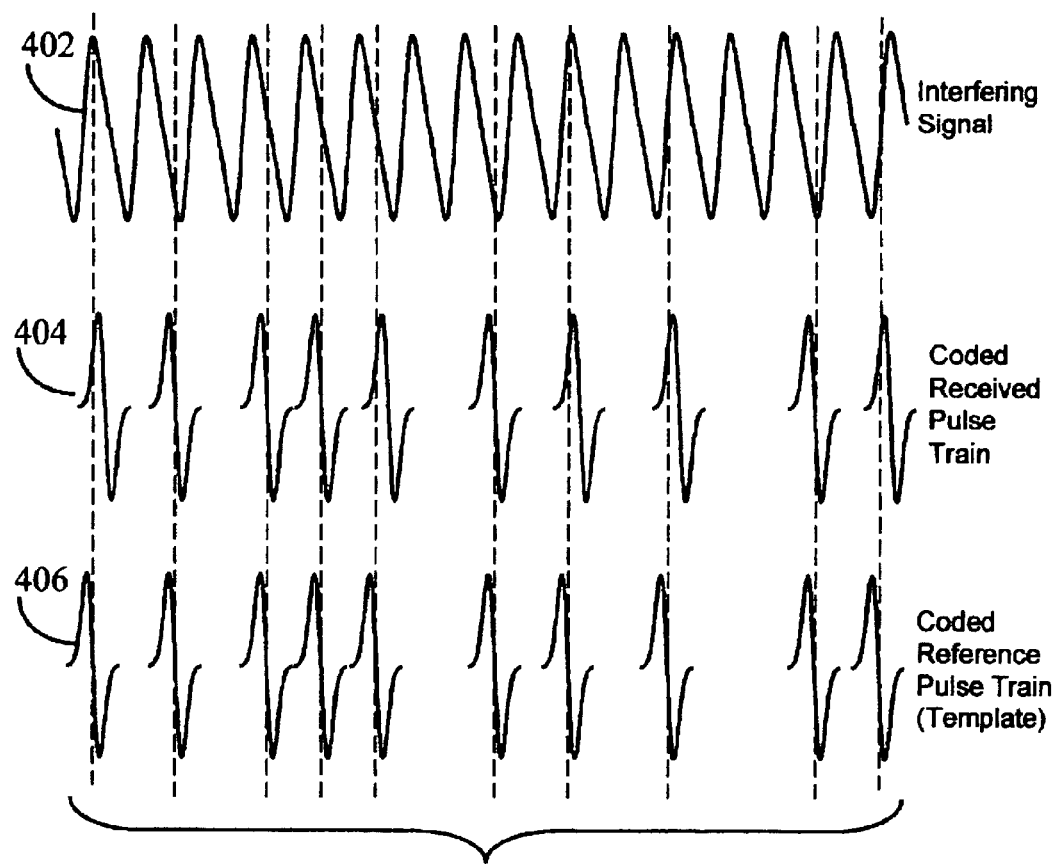
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5A:
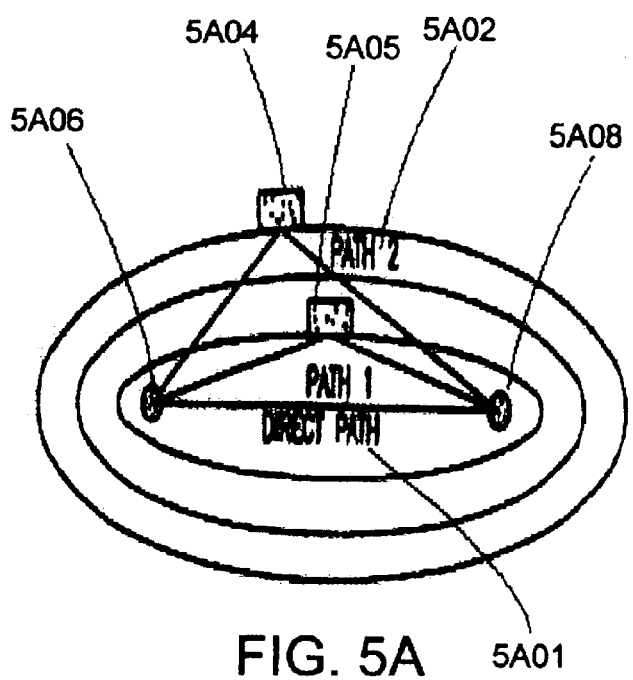
FIG. 5A illustrates a typical geometrical configuration giving rise to multipath received signals.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
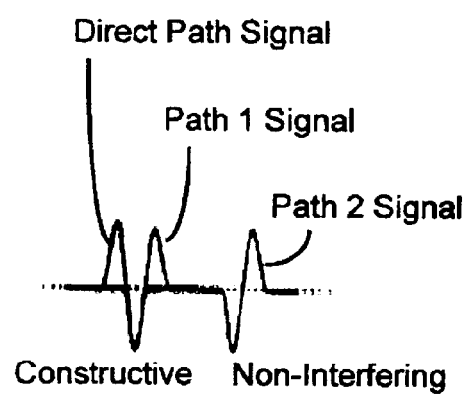
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
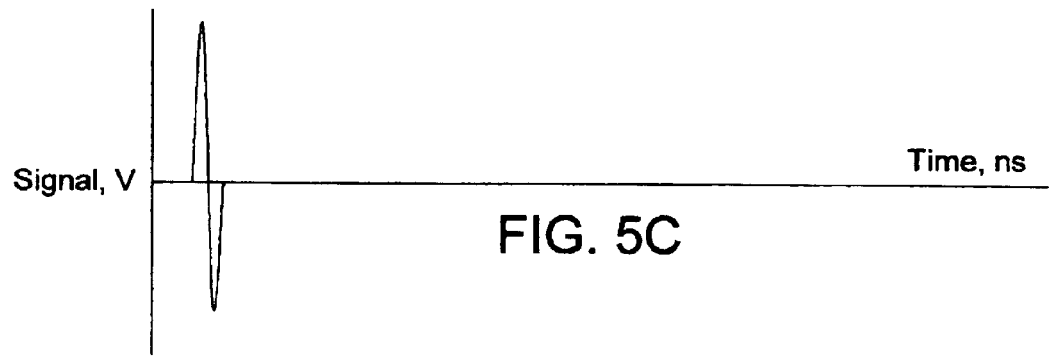
FIGS. 5C–5E illustrate a signal plot of various multipath environments.
Figure 5D:
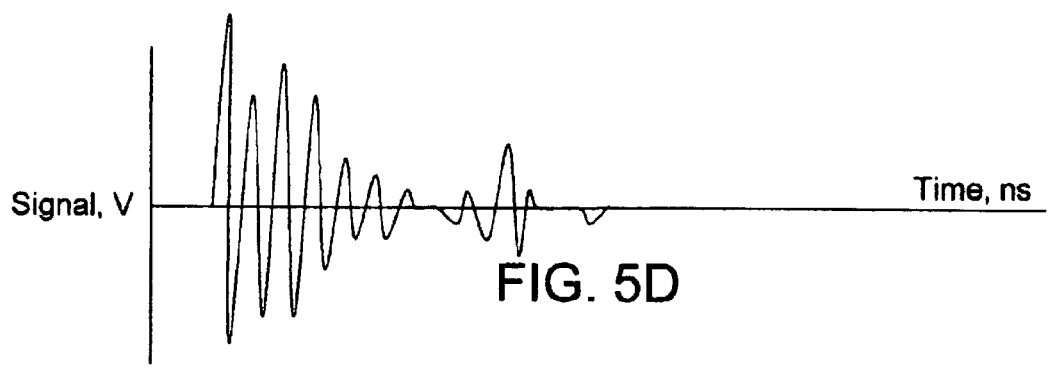
Figure 5E:
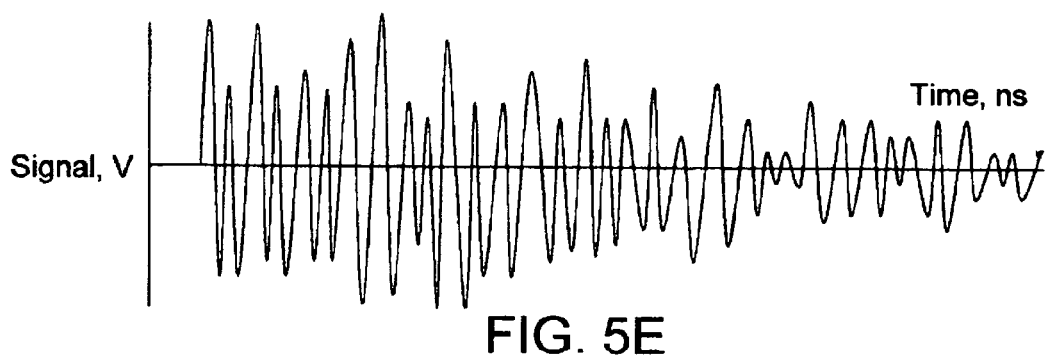

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be canceled simultaneously and precisely while blocking the direct path—a highly unlikely scenario. This time separation of mulitpath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and
$\sqrt{2}\sigma^2$ is the RMS amplitude of the combined mulitpath signals.

Figure 5F:
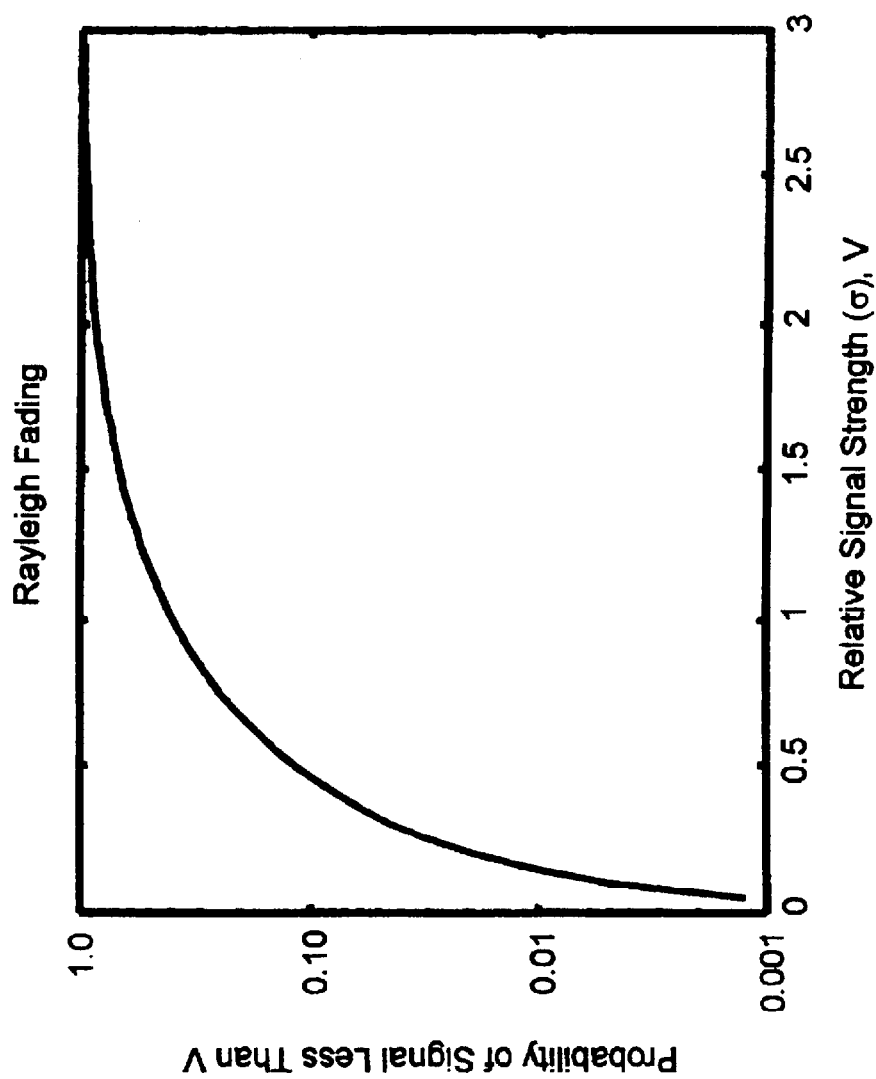
FIG. 5F illustrates the Rayleigh fading curve associated with non-impulse radio transmissions in a multipath environment.

This distribution is shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
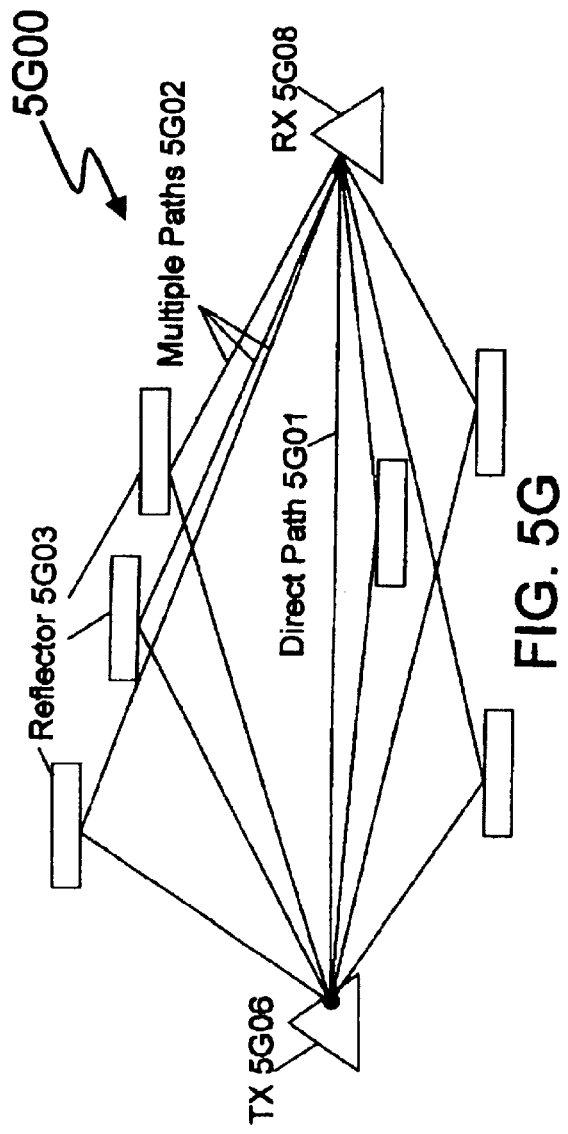
FIG. 5G illustrates a plurality of multipaths with a plurality of reflectors from a transmitter to a receiver.
Figure 5H:
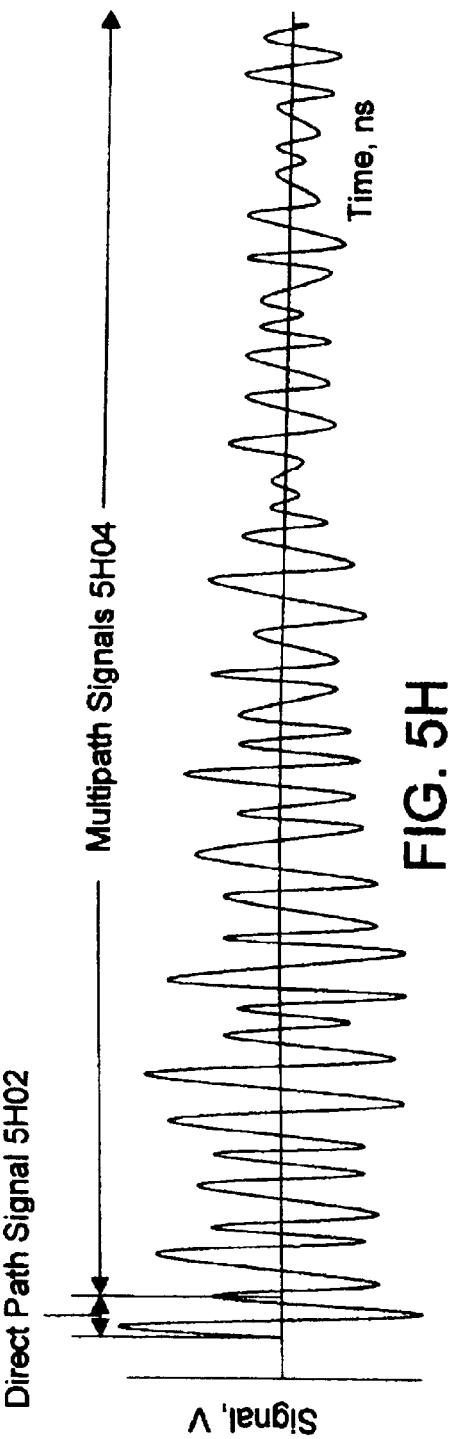
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

Figure 6:
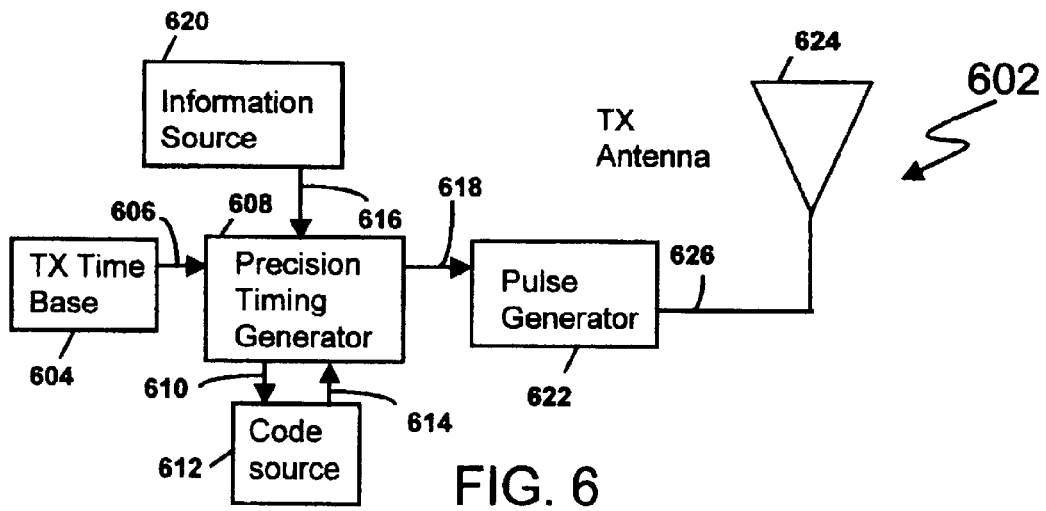
FIG. 6 illustrates a representative impulse radio transmitter functional diagram.

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

Figure 7:
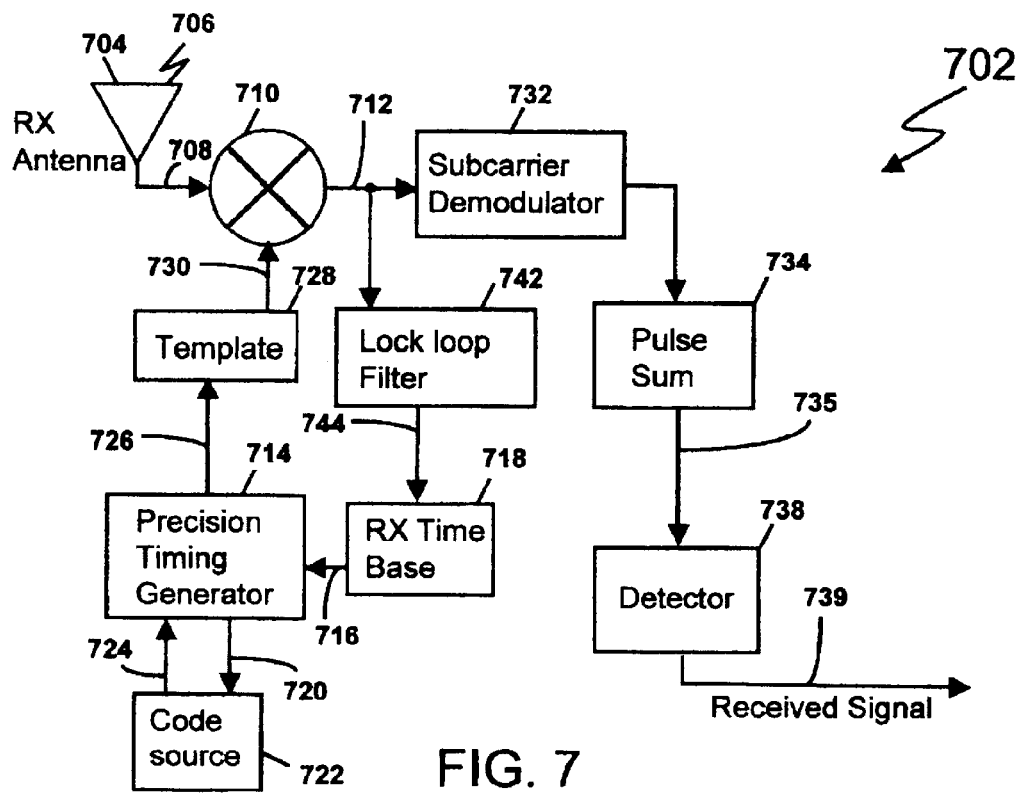
FIG. 7 illustrates a representative impulse radio receiver functional diagram.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. Antennas employed in such impulse radio communication systems (as well as in other impulse radio systems, such as positioning systems or other systems) have special requirements for effecting efficient operation. It is desirable to have a UWB antenna system that is selectively insensitive to one or more narrow bands of interest. Such selective insensitivity may be advantageously established in order to avoid interference with certain particular frequencies within the UWB operating range of the antenna. For example, frequency rejection may be arranged to avoid interference with global positioning system (GPS) equipment or cellular telephone equipment. Preferably, a UWB antenna system is embodied in a single UWB antenna with a frequency sensitive response offering multi-band narrowband coverage, as well as an ultra wideband response with significantly lesser sensitivity of response to signals within particular narrow rejection frequency bands.

Providing for frequency rejection at particular rejection frequencies within the UWB operating range of an antenna may be accommodated by employing a novel antenna element construction according to the present invention.

Figure 9:
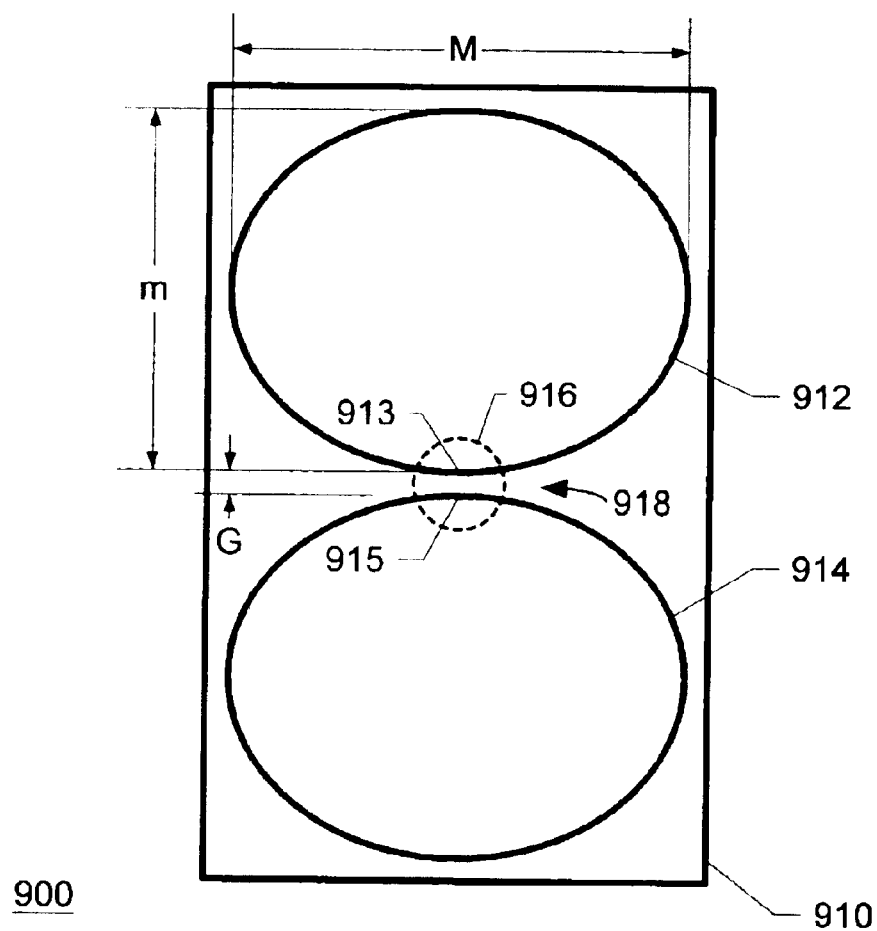
FIG. 9 illustrates an exemplary prior art elliptical planar dipole ultra wideband (UWB) antenna.

FIG. 9 illustrates an exemplary prior art elliptical planar dipole ultra wideband (UWB) antenna. In FIG. 9, an antenna apparatus 900 includes a substrate 910 on which are situated a first antenna element 912 and a second antenna element 914. Antenna elements 912, 914 are commonly constructed of substantially planar copper plates and may be situated on opposing sides of substrate 910 or on the same side of substrate 910. Antenna elements 912, 914 are illustrated in their most preferred shape as being elliptical having a major axis "M" and a minor axis "m". Typical ratios of m:M include, for example, 1:1.25 and 1:1.50. Antenna elements 912, 914 are separated by a gap 918 establishing a gap dimension "G" between antenna elements 912, 914. Energy is coupled into and out of antenna elements 912, 914 (for transmitting and receiving operations) at a feed region 916 via a transmission line or other known RF connection structure (not shown in detail in FIG. 9). Feed region 916 includes a slotline structure formed by lower edge 913 of first antenna element 912 and upper edge 915 of second antenna element 914. Terms such as "upper" and "lower" are used merely as descriptive aids to assist in understanding the relative position of components of antenna apparatus 900, and such terms should not be construed to limit any particular orientation of antenna apparatus 900.

Figure 13:
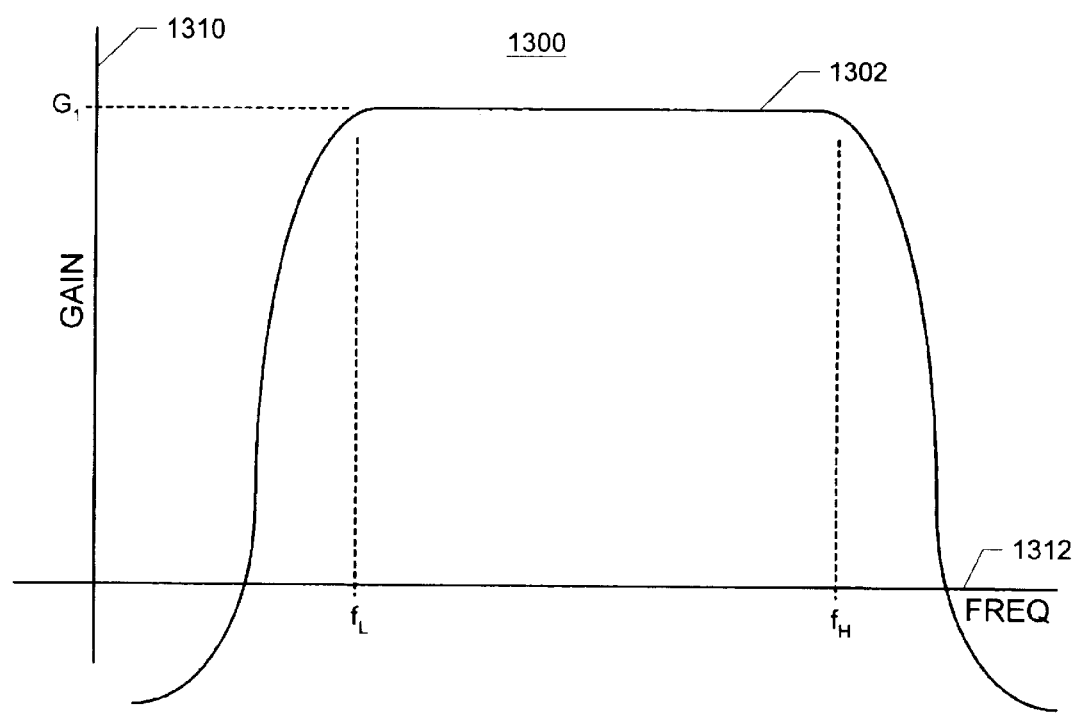
FIG. 13 is a graphical illustration of a typical frequency response for a UWB antenna element.

Antennas such as antenna apparatus 900 have many desirable properties including excellent impedance matching and a uniform ultra wideband (UVB) frequency response across a significantly wide range in frequencies (FIG. 13). However, this same desirable UWB response leaves antenna apparatus 900 open to interference by receiving a narrowband source of interference, or to causing interference by transmitting in a particular narrow band being used by a neighboring RF system.

By way of example, one may desire to co-locate a UWB system in close proximity with relatively narrowband equipment, such as PCS (personal communication system) or GPS (global positioning system) equipment. The relatively high power signals of narrowband equipment, such as PCS, may interfere with the nearby UWB system, and conversely, the UWB system may interfere with a co-located low power narrow band system, such as GPS. To minimize such interference, it is desirable to have a UWB antenna system that is not sensitive to one or more narrow bands of interest. It is further desirable to provide a compact antenna system that is simple in construction (thereby contributing to reliability of operation) and efficiently operates to effect selective response to preclude interference with particular frequencies. Such an antenna preferably offers multi-band narrowband coverage as well as an ultra wideband response with particular narrow bands rejected.

Figure 10:
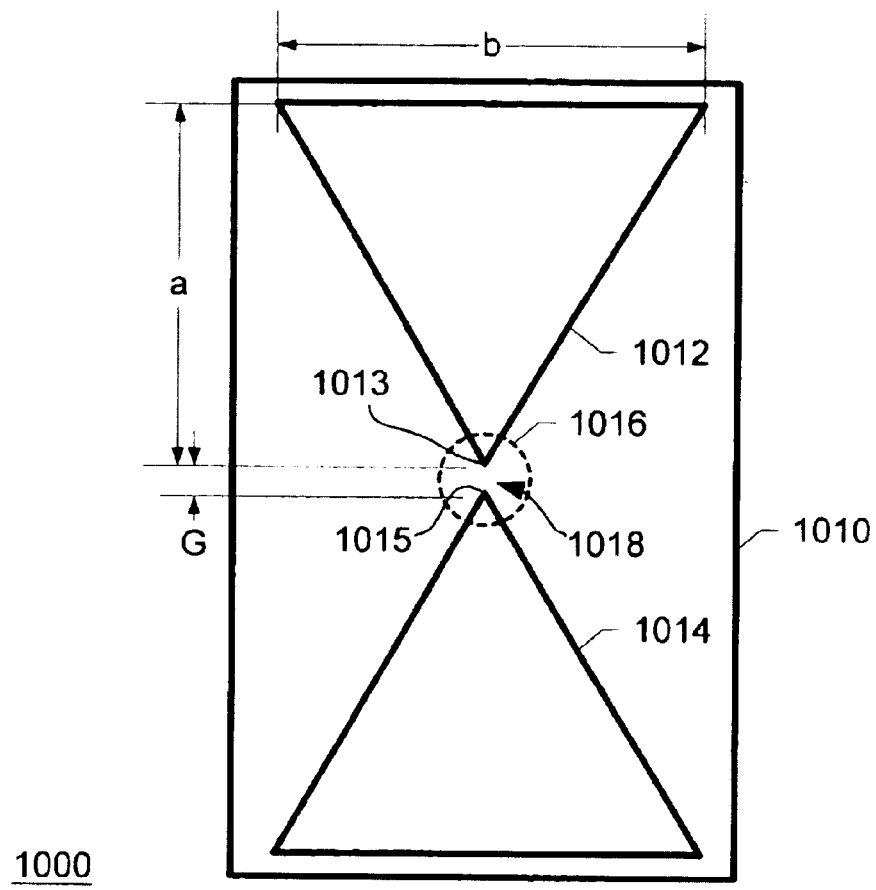
FIG. 10 illustrates an exemplary prior art bow tie planar dipole ultra wideband (UWB) antenna.

FIG. 10 illustrates an exemplary prior art bow tie planar dipole ultra wideband (UWB) antenna. In FIG. 10, an antenna apparatus 1000 includes a substrate 1010 on which are situated a first antenna element 1012 and a second antenna element 1014. Antenna elements 1012, 1014 are commonly constructed of substantially planar copper plates and may be situated on opposing sides of substrate 1010 or on the same side of substrate 1010. Antenna elements 1012, 1014 are illustrated as being triangular having a base "b" and an altitude "a". Antenna elements 1012, 1014 are separated by a gap 1018 establishing a gap dimension "G" between antenna elements 1012, 1014. Energy is coupled into and out of antenna elements 1012, 1014 (for transmitting and receiving operations) at a feed region 1016 via a transmission line or other known RF connection structure (not shown in detail in FIG. 10). Feed region 1016 includes a slotline structure formed by apex 1013 of first antenna element 1012 and apex 1015 of second antenna element 1014.

Figure 11:
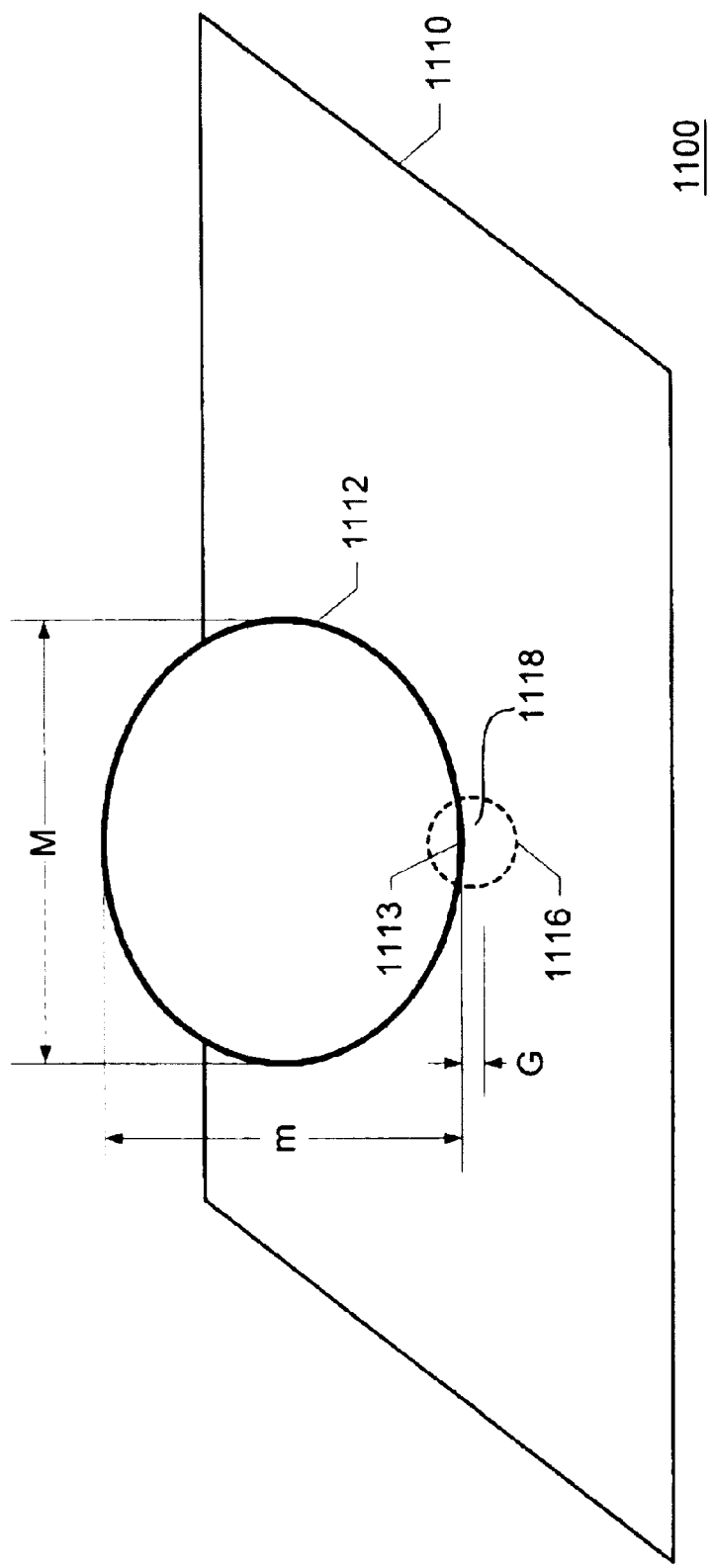
FIG. 11 illustrates an exemplary prior art elliptical planar monopole ultra wideband (UWB) antenna.

FIG. 11 illustrates an exemplary prior art elliptical planar monopole ultra wideband (UWB) antenna. In FIG. 11, an antenna apparatus 1100 includes a substantially planar substrate 1110 with which is situated an antenna element 1112. Antenna element 1112 is commonly oriented substantially perpendicular with substrate 1110. Antenna element 1112 is commonly a substantially planar copper plate. Antenna element 1112 is illustrated in its most preferred shape as being elliptical having a major axis "M" and a minor axis "m". Typical ratios of m:M include, for example, 1:1.25 and 1:1.50. Antenna element 1112 is separated from substrate 1110 by a gap 1118 establishing a gap dimension "G" between antenna element 1112 and substrate 1110. Energy is coupled into and out of antenna element 1112 and substrate 1110 (for transmitting and receiving operations) at a feed region 1116 via a transmission line or other known RF connection structure (not shown in detail in FIG. 11). Feed region 1116 includes a slotline structure formed by lower edge 1113 of antenna element 1112 and substrate 1110.

Figure 12:
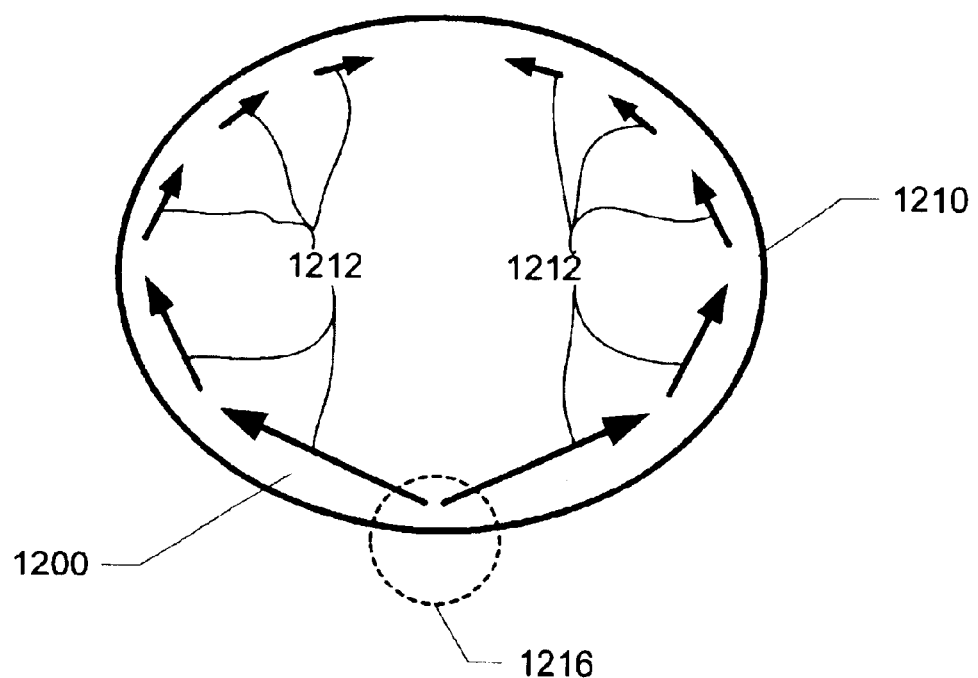
FIG. 12 illustrates current flow within a typical prior art elliptical planar antenna element.

FIG. 12 illustrates current flow within a typical prior art elliptical planar antenna element. Antennas experience alternating current flows in substantially opposite directions in transmitting or receiving electromagnetic signals. FIG. 12 illustrates current flow in a representative elliptical antenna element during one half-cycle of such an alternating current flow. During the remaining half-cycle of alternating current flow the current flow pattern would be substantially the same in the opposite direction than illustrated in FIG. 12. The pattern of current flow illustrated in FIG. 12 is substantially the same for any of the antenna elements 912, 914 (FIG. 9) and 1012 (FIG. 10); the current flow is analogously similar in bow tie antenna elements 1012, 1014 as will be understood by those skilled in the art of antenna design.

In FIG. 12, an antenna element 1200 is coupled for electromagnetic signal transfer (for reception or for transmission operation) at a feed region 1216 by a transmission line or similar radio frequency (RF) transmission structure (not shown in FIG. 12). Current flows substantially about the periphery 1210 of antenna element 1200 as indicated by arrows 1212. Magnitude of current flow diminishes as distance from feed region 1216 increases, as indicated by varied lengths of arrows 1212. Arrows 1212 distal from feed region 1216 are shorter than arrows 1212 proximate to feed region 1216, indicating a lesser magnitude of current flow distal from feed region 1216 than proximate to feed region 1216.

FIG. 13 is a graphical illustration of a typical frequency response for a UWB antenna element. In FIG. 13, a graph 1300 presents a response curve 1302 indicating gain of an antenna element or system plotted on an axis 1310 as a function of frequency plotted on an axis 1312. The antenna system represented by graph 1300 is an ultra wideband system as indicated by the gain of the antenna increasing sharply generally at a lower frequency $f_L$ to a gain $G_1$ and remaining substantially at gain $G_1$ until an upper frequency $f_H$ is reached. Thus, the gain of the antenna system is substantially flat between frequencies $f_L$, $f_H$.

Figure 14:
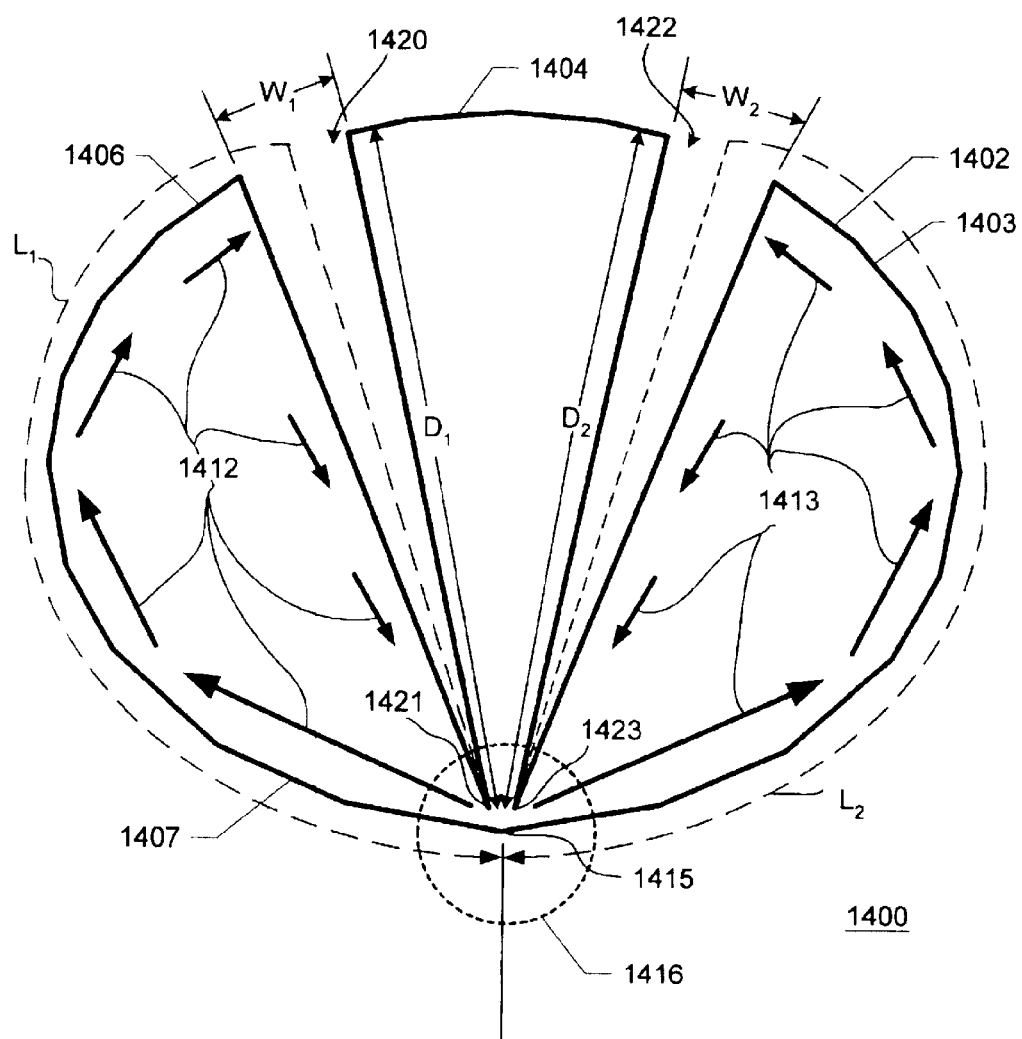
FIG. 14 illustrates a first embodiment of the antenna apparatus of the present invention, including current flow within the apparatus.

FIG. 14 illustrates a first embodiment of the antenna apparatus of the present invention, including representative current flow within the apparatus. In FIG. 14, an antenna element 1400 is coupled for electromagnetic signal transfer (for reception or for transmission operation) substantially at a feed point 1415 in a feed region 1416 by a transmission line or similar radio frequency (RF) transmission structure (not shown in FIG. 14). Antenna element 1400 differs from prior art antenna element 1200 (FIG. 12) chiefly in the removal of notch areas 1420, 1422. Notch area 1420 is dimensioned with a width $W_1$ and a depth $D_1$ to an apex 1421. Notch area 1422 is dimensioned with a width $W_2$ and a depth $D_2$ to an apex 1423. Notch areas 1420, 1422 substantially divide antenna element 1400 into three antenna segments 1402, 1404, 1406. Antenna segments 1402, 1404, 1406 are commonly connected in the region of feed point 1415, but are increasingly widely separated as one departs from apexes 1421, 1423 to depths D1, D2 at which locus separation between antenna segments 1404, 1406 is width $W_1$ and separation between antenna segments 1404, 1402 is width $W_2$.

Current flows substantially about the periphery 1407 of antenna segment 1406 as indicated by arrows 1412. Current flows substantially about the periphery 1403 of antenna segment 1402 as indicated by arrows 1413. Magnitude of current flow diminishes as distance from feed region 1416 increases, as indicated by varied lengths of arrows 1412, 1413. Arrows 1412, 1413 distal from feed region 1416 are shorter than arrows 1412, 1413 proximate to feed region 1416, indicating a lesser magnitude of current flow distal from feed region 1416 than proximate to feed region 1416. Antenna segment 1404 also experiences current flow about its periphery. Those currents are understood by those skilled in the art of antenna design and are not illustrated in FIG. 14 in an effort to keep the explanation of the operation and structure of the invention simple and straightforward.

Notch areas 1420, 1422 establish a feedback path for currents within antenna element 1400 to create response degradation for antenna element 1400 at certain specific frequencies. For example, a path length $L_1$ from feed point 1415 along periphery 1407 of antenna segment 1406 into notch area 1420 to apex 1421, and a path length $L_2$ from feed point 1415 along periphery 1403 of antenna segment 1402 into notch area 1422 to apex 1423 are preferably chosen to satisfy the relationship:

$$L_n \sim \frac{n\lambda_{SELECT}}{2},$$

where
$L_n$ is one of path length $L_1$, $L_2$,
n is an odd integer (n=1, 3, 5, etc.) and
$\lambda_{SELECT}$ is the wavelength of a selected frequency $f_{SELECT}$ at which an antenna element is to exhibit reduced responsiveness.

Typically, n is taken as n=1 to select the lowest order resonance, but of course, one skilled in the art realizes that that a particular path length will have multiple harmonics that may be useful in some applications. For instance, if one wishes to reduce the responsiveness of the antenna at a pair of frequencies whose ratio is approximately 1:3, it may be possible to accomplish this using multiple modes of a single physical notch.

By establishing path lengths $L_1$, $L_2$ according to such a relationship with respect to selected frequency $f_{SELECT}$, currents are returned to feed region 1416 that interfere with signals at selected frequency $f_{SELECT}$ so that responsiveness of antenna element 1400 is reduced at selected frequency $f_{SELECT}$.

One of notch area 1420, 1422 suffices to establish reduced responsiveness by antenna element 1400 at a selected frequency $f_{SELECT}$. Having two notch areas 1420, 1422 substantially symmetrically situated in antenna element 1400 with respective path lengths $L_1$, $L_2$ substantially equal (as illustrated in FIG. 14) reinforces and accentuates the reduced responsiveness of antenna element 1400 at the selected frequency $f_{SELECT}$.

Other selected frequencies may be established for reduced responsiveness by adding notches to antenna element 1400 at different path lengths $L_n$. However, such additional notch areas at different path lengths $L_n$ result in less-defined changes in response of antenna element 1400 at the various selected frequencies $f_n$ than is experienced when a single selected frequency $f_{SELECT}$ is established, as shown in the preferred embodiment of the invention illustrated in FIG. 14.

Figure 15:
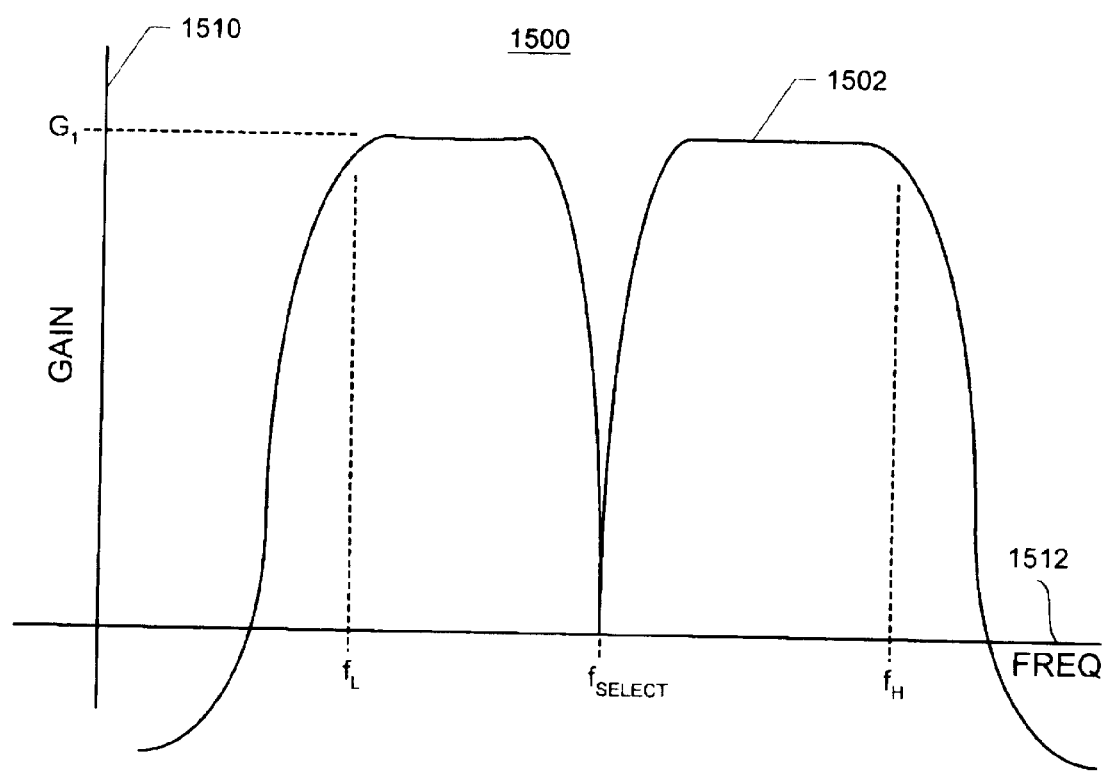
FIG. 15 is a graphical illustration of a frequency response for a UWB antenna apparatus configured according to the first embodiment of the present invention illustrated in FIG. 14.

FIG. 15 is a graphical illustration of a frequency response for a UWB antenna apparatus configured according to the first embodiment of the present invention illustrated in FIG. 14. In FIG. 15, a graph 1500 presents a response curve 1502 indicating gain of an antenna element or system plotted on an axis 1510 as a function of frequency plotted on an axis 1512. The antenna system represented by graph 1500 is an ultra wideband system as indicated by the gain of the antenna increasing sharply generally at a lower frequency $f_L$ to a gain $G_1$ and remaining substantially at gain $G_1$ until an upper frequency $f_H$ is reached, except for a marked deviation from gain $G_1$ in the vicinity of frequency $f_{SELECT}$. Thus, the antenna system exhibits a substantially flat, continuous signal response between frequencies $f_L$, $f_H$ and further exhibits a significant deviation from the otherwise continuous signal response at selected frequency $f_{SELECT}$ between frequencies $f_L$, $f_H$.

Figure 16:
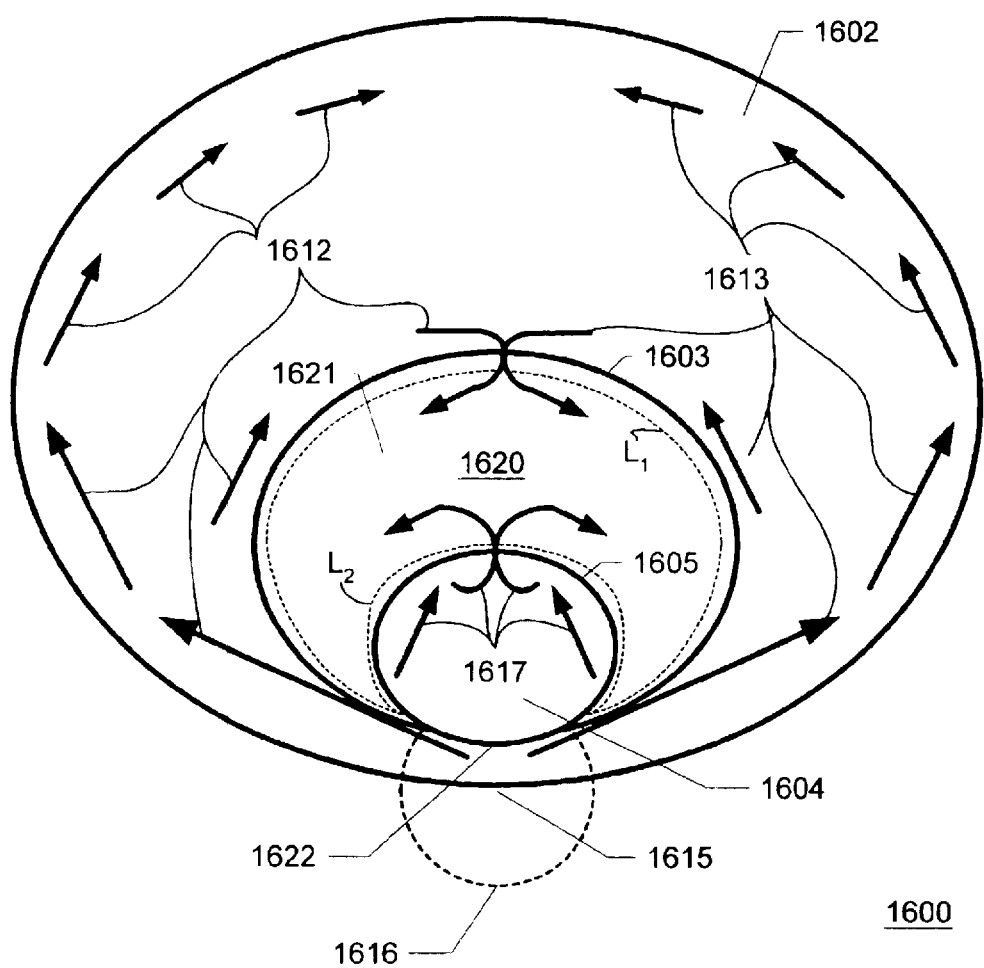
FIG. 16 illustrates a second embodiment of the antenna apparatus of the present invention, including current flow within the apparatus.

FIG. 16 illustrates a second embodiment of the antenna apparatus of the present invention, including current flow within the apparatus. In FIG. 16, an antenna element 1600 is coupled for electromagnetic signal transfer (for reception or for transmission operation) substantially at a feed point 1615 in a feed region 1616 by a transmission line or similar radio frequency (RF) transmission structure (not shown in FIG. 16). Antenna element 1600 is configured with a notch area 1621. Antenna element 1600 includes a first antenna segment 1602 generally in the shape of a first ellipse having void area 1620 within its borders and skewed toward feed point 1615. Antenna element 1600 further includes a second antenna segment 1604 in the shape of a second ellipse smaller than the first ellipse (i.e., first antenna segment 1602). Antenna segment 1604 is situated within void area 1620 of first antenna segment 1602 and is generally tangentially arranged against an edge segment 1622 of edge 1603 of first antenna segment 1602 within feed region 1616. The portion of the void area 1620 that is not occupied by second antenna segment 1604 establishes notch area 1621. In such an arrangement void area 1620 is substantially bounded by a first edge 1603 defining a limit of first antenna segment 1602 and a second edge 1605 defining a limit of second antenna segment 1604. First edge 1603 has a path length $L_1$; second edge 1605 has a path length $L_2$.

Antenna segments 1602, 1604 are commonly connected in the region of feed point 1615, but are increasingly widely separated as one departs along edges 1603, 1605 from feed point 1615. Current flows within antenna segment 1602 substantially as indicated by arrows 1612, 1613. Current flows within antenna segment 1604 substantially as indicated by arrows 1617. Magnitude of current flow diminishes as distance from feed region 1616 increases, as indicated by varied lengths of arrows 1612, 1613, 1617. Arrows 1612, 1613, 1617 distal from feed region 1616 are shorter than arrows 1612, 1613, 1617 proximate to feed region 1616, indicating a lesser magnitude of current flow distal from feed region 1616 than proximate to feed region 1616.

Edges 1603, 1605 bound void area 1620 and establish feedback paths for currents within antenna element 1600 to create response degradation for antenna element 1600 at certain specific frequencies. For example, path length $L_1$ departing from and returning to feed point 1615 along edge 1603 of antenna segment 1602, and path length $L_2$ departing from and returning to feed point 1615 along edge 1605 of antenna segment 1604 are preferably chosen to satisfy the relationship:

$$L_n \sim \frac{n \lambda_{SELECT(n)}}{2},$$

where
 $L_n$ is one of path length $L_1$, $L_2$,
 n is an odd integer (n=1, 3, 5, etc.) and
 $\lambda_{SELECT(n)}$ is the wavelength of a selected frequency $f_{SELECT(n)}$ associated with a particular path length $L_n$ at which an antenna element is to exhibit reduced responsiveness.

Typically, n is taken as n=1 to select the lowest order resonance, but of course, one skilled in the art realizes that that a particular path length will have multiple harmonics that may be useful in some applications. For instance, if one wishes to reduce the responsiveness of the antenna at a pair of frequencies whose ratio is approximately 1:3, it may be possible to accomplish this using multiple modes of a single physical notch.

By establishing path lengths $L_1$, $L_2$ according to such a relationship with respect to selected frequencies $f_{SELECT(n)}$, currents are returned to feed region 1616 that interfere with signals at selected frequencies $f_{SELECT(n)}$ so that responsiveness of antenna element 1600 is interfered with and therefore reduced at selected frequencies $f_{SELECT(n)}$. If two frequencies $f_{SELECT(n)}$ are chosen substantially close to each other, then responsiveness of an antenna element 1600 may be reduced substantially about a narrow frequency range, substantially as though responsiveness is degraded at a particular selected frequency.

Figure 17:
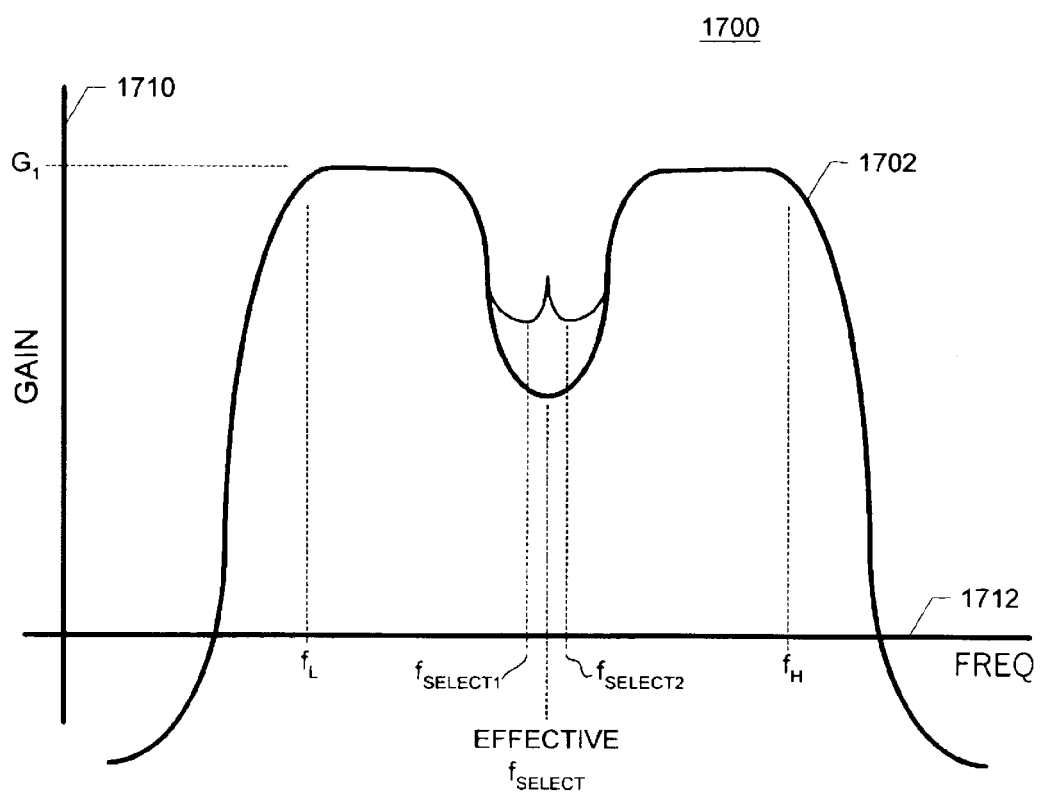
FIG. 17 is a graphical illustration of a frequency response for a UWB antenna apparatus configured according to the second embodiment of the present invention illustrated in FIG. 16.

FIG. 17 is a graphical illustration of a frequency response for a UWB antenna $f_{SELECT(n)}$ apparatus configured according to the second embodiment of the present invention illustrated in FIG. 16. In FIG. 17, a graph 1700 presents a response curve 1702 indicating gain of an antenna element or system plotted on an axis 1710 as a function of frequency plotted on an axis 1712. The antenna system represented by graph 1700 is an ultra wideband system as indicated by the gain of the antenna increasing sharply generally at a lower frequency $f_L$ to a gain $G_1$ and remaining substantially at gain $G_1$ until an upper frequency $f_H$ is reached, except for a marked deviation from gain $G_1$ in the vicinity of frequencies ranging between $f_{SELECT1}$ to $f_{SELECT2}$. Frequencies $f_{SELECT1}$, $f_{SELECT2}$ have been chosen sufficiently close to each other that their additive effect to deviation of response curve 1302 from gain $G_1$ is reflected in response curve 1302 as a single trough deviation of response from gain $G_1$ substantially at an effective frequency $f_{SELECT}$. Thus, the antenna system exhibits a substantially flat, continuous signal response between frequencies $f_L$, $f_H$ and further exhibits a significant deviation from the otherwise continuous signal response effectively at selected frequency $f_{SELECT}$ between frequencies $f_L$, $f_H$.

Figure 18:
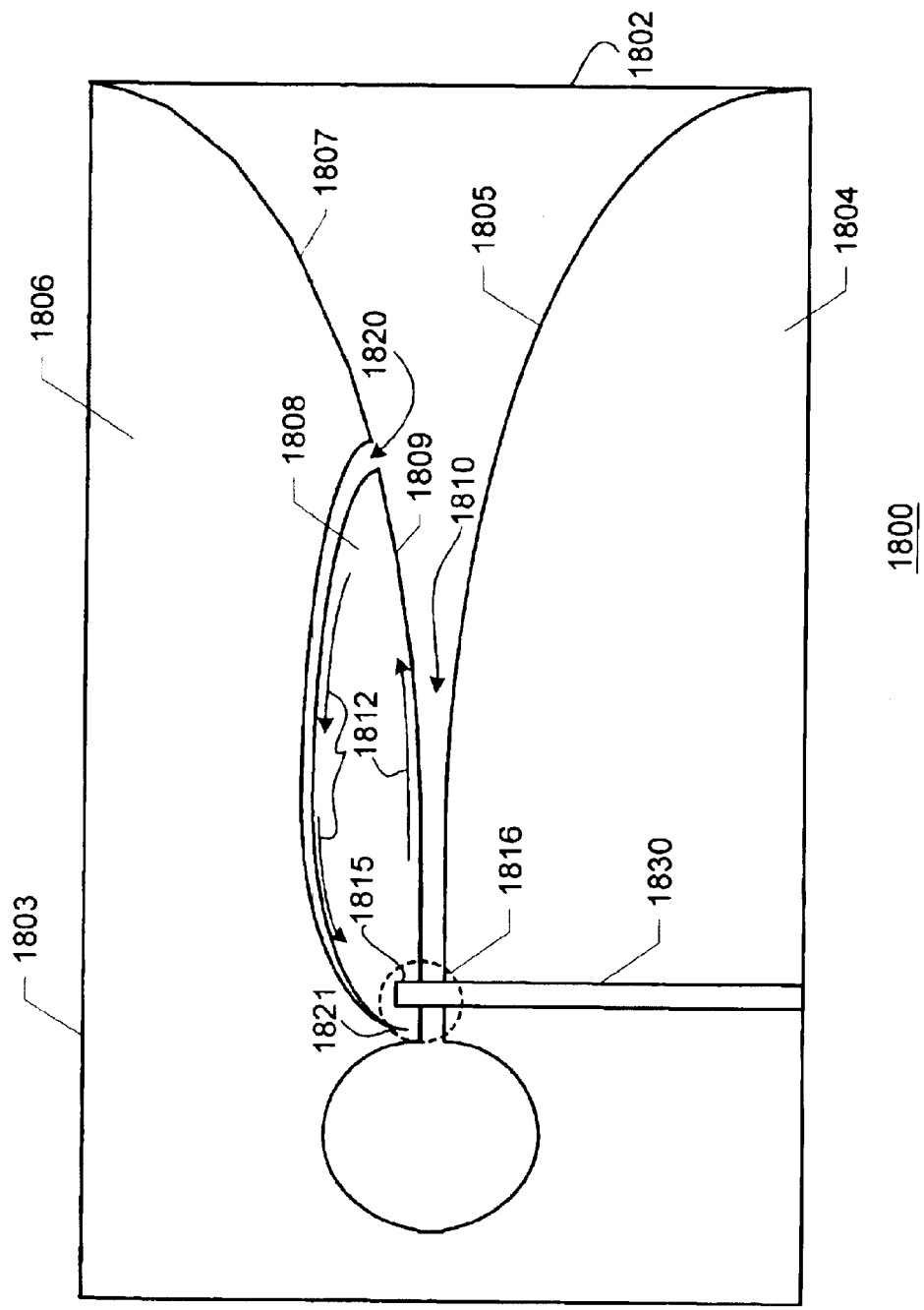
FIG. 18 illustrates a third embodiment of the antenna apparatus of the present invention embodied in a planar horn antenna structure.

FIG. 18 illustrates a third embodiment of the antenna apparatus of the present invention embodied in a planar horn antenna structure. In FIG. 18, a horn antenna structure 1800 is carried on a substrate 1802. An antenna element 1803 integrally includes transceiving structures 1804, 1806. Transceiving structures 1804, 1806 establish a slotline structure 1810 between respective edges 1805, 1807. Antenna element 1803 is coupled for electromagnetic signal transfer (for reception or for transmission operation) substantially at a feed point 1815 in a feed region 1816 by a transmission line 1830 or similar radio frequency (RF) transmission structure.

Antenna element 1803 has a notch area 1820 extending from edge 1807 to an apex 1821. Notch area 1820 substantially divides transceiving structure 1806 to establish an antenna segment 1808. Antenna segment 1808 is commonly connected with transceiving structure 1806 in the region of feed point 1815; transceiving structure 1806 and antenna segment 1808 are increasingly widely separated as one departs from apex 1821 to edge 1807. Current flows substantially about the periphery 1809 of antenna segment 1808 as indicated by arrows 1812, returning to feed point 1815 to establish a feedback path for currents within antenna structure 1800 to create response degradation for antenna structure 1800 substantially at a certain specific frequency, in a manner similar to feedback current paths established in antenna element 1400 (FIG. 14) and antenna element 1600 (FIG. 16).

Figure 19:
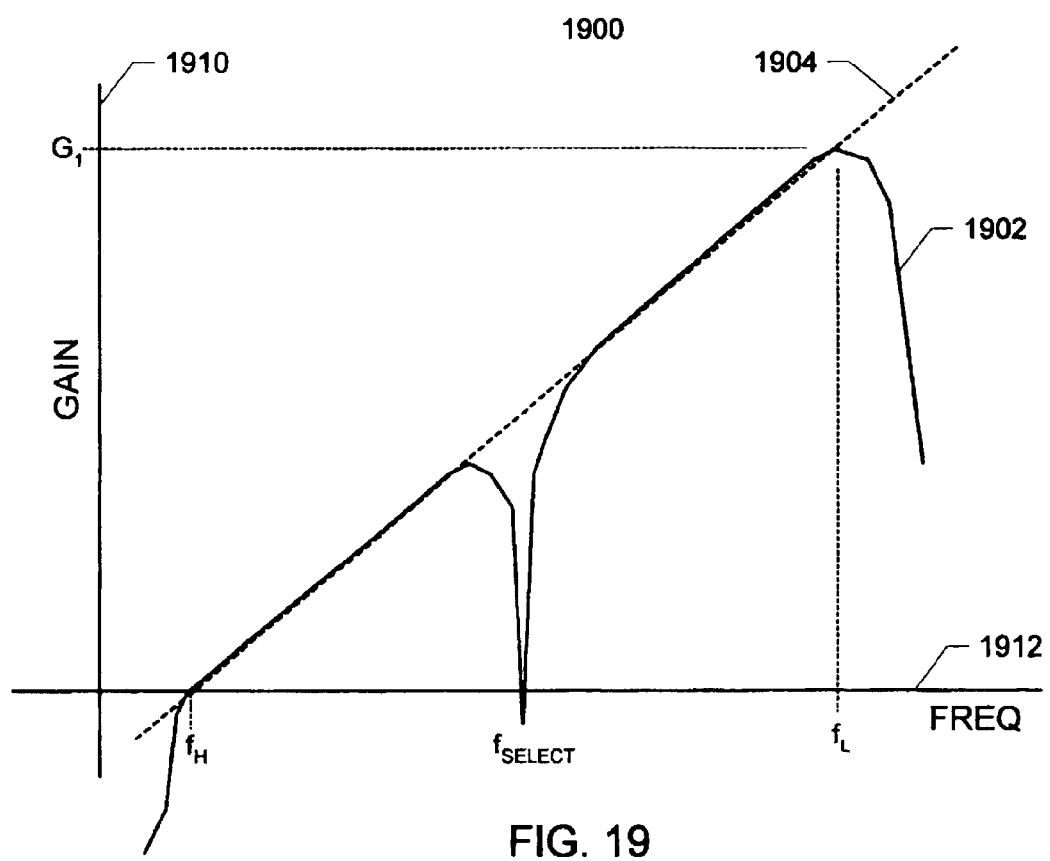
FIG. 19 is a graphical illustration of a frequency response for a UWB antenna apparatus configured according to the third embodiment of the present invention illustrated in FIG. 18.

FIG. 19 is a graphical illustration of a frequency response for a UWB antenna apparatus configured according to the third embodiment of the present invention illustrated in FIG. 18. In FIG. 19, a graph 1900 presents a response curve 1902 indicating gain of an antenna element or system plotted on an axis 1910 as a function of frequency plotted on an axis 1912. The antenna system represented by graph 1900 has a generally continuous, substantially linear gain response along a reference line 1904, except for a marked deviation from reference line 1904 in the vicinity of frequency $f_{SELECT}$. Thus, the antenna system exhibits a substantially linear, continuous signal response between frequencies $f_L$, $f_H$ and further exhibits a significant deviation from the otherwise continuous signal response substantially at selected frequency $f_{SELECT}$ between frequencies $f_L$, $f_H$.

The description of the preferred embodiments of the invention presented in the present application relate to constructing an antenna with an ultra wideband response except at one or more selected frequencies within the operating range of the antenna. One skilled in the art of antenna design will recognize that the teachings of the present invention may also be employed to construct a multi narrowband antenna, an antenna that is responsive within a plurality of narrow frequency bands. Such a multi narrowband antenna may be constructed by employing the configuration taught by the present invention to reduce response of an otherwise ultra wideband antenna across predetermined undesired frequency bands leaving only desired narrow frequency bands in which the antenna remains responsive.

Such a multi narrowband antenna can typically tolerate a greater number of frequency rejecting "notch" structures than can be tolerated by an ultra wideband antenna. In the case of an ultra wideband antenna, it is desired that the phase response be linear across the entire operating band of the antenna. An excessive number of frequency rejecting structures tends to impair such desired phase linearity and hurt overall system performance. A multi narrowband antenna does not typically require phase linearity from band to band. As a result, more, wider and deeper reductions in frequency response of such a multi narrowband antenna are practical and acceptable. The present invention teaches that a multi narrowband antenna may be created from an ultra wideband antenna by reducing the response of the ultra wideband antenna in selected undesired frequency ranges.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

What is claimed is:

1. An electromagnetic antenna apparatus; the apparatus exhibiting a generally continuous signal response between a first frequency and a second frequency; the apparatus exhibiting a deviation from said signal response in a frequency region centered substantially at a selected frequency between said first frequency and said second frequency; the apparatus comprising:

(a) a substantially planar substantially plate-like antenna transceiving element having a periphery;

(b) a feed structure; said feed structure being coupled with said antenna transceiving element for communicating transceiving signals with said antenna transceiving element; and (c) a discontinuity structure in said periphery; said discontinuity structure being connected with said feed structure; said discontinuity structure being configured for effecting return of selected said transceiving signals to said feed structure as return signals; said return signals effecting said deviation.

2. An electromagnetic antenna apparatus as recited in claim 1 wherein said antenna transceiving element has a polygonal shape defined by said periphery; said discontinuity structure including a first deviation structure interrupting said periphery at a first deviation locus displaced a first peripheral distance in a first direction along said periphery from said feed structure; said first deviation structure extending to a first return distance from said first deviation locus toward said feed structure; said first return distance being sufficient to establish signal coupling between said first deviation structure and said feed structure.

3. An electromagnetic antenna apparatus as recited in claim 2 wherein said selected frequency has a selected wavelength and wherein said first peripheral distance plus said first return distance substantially approximates one-half said selected wavelength.

4. An electromagnetic antenna apparatus as recited in claim 2 wherein said discontinuity structure further includes a second deviation structure interrupting said periphery at a second deviation locus displaced a second peripheral distance in a second direction along said periphery from said feed structure; said second deviation structure extending to a second return distance from said second deviation locus toward said feed structure; said second return distance being sufficient to establish signal coupling between said second deviation structure and said feed structure.

5. An electromagnetic antenna apparatus as recited in claim 4 wherein said selected frequency has a selected wavelength and wherein said second peripheral distance plus said second return distance substantially approximates one-half said selected wavelength.

6. An electromagnetic antenna apparatus as recited in claim 1 wherein said antenna transceiving element has a substantially elliptical shape defined by said periphery having a peripheral length; said elliptical shape being oriented substantially symmetrically with respect to a major axis and a minor axis perpendicular with said major axis; said discontinuity structure including a material-free zone within said periphery; said material-free zone being delineated by a first border having a first edge length and a second border having a second edge length greater than said first edge length and less than said peripheral length; said first border and said second border meeting at a pair of termini; each terminus of said pair of termini being situated sufficiently near said feed structure to establish signal coupling between said deviation structure and said feed region.

7. An electromagnetic antenna apparatus as recited in claim 6 wherein said frequency region is bounded by a lower frequency having a longer wavelength and by a higher frequency having a shorter wavelength; and wherein said first edge length approximates one-half said shorter wavelength and said second edge length approximates one-half said longer wavelength.

8. An electromagnetic antenna apparatus; the apparatus exhibiting a generally continuous signal response between a first frequency and a second frequency; the apparatus exhibiting a deviation from said signal response in a frequency region centered substantially at a selected frequency between said first frequency and said second frequency; the apparatus comprising:

(a) at least one substantially planar substantially plate-like antenna transceiving element having a periphery;

(b) a feed structure for each respective antenna transceiving element of said at least one antenna transceiving element; transceiving signals being communicated with each said respective antenna transceiving element via a respective said feed structure;

(c) a discontinuity structure in said periphery of at least one selected antenna transceiving element of said at least one antenna transceiving element; said discontinuity structure being connected with said respective feed structure for said at least one selected selected antenna transceiving element; said discontinuity structure being configured for effecting return of selected said transceiving signals to said respective feed structure as return signals; said return signals effecting said deviation.

9. An electromagnetic antenna apparatus as recited in claim 8 wherein said at least one selected antenna transceiving element has a polygonal shape defined by said periphery; said discontinuity structure including a first deviation structure interrupting said periphery at a first deviation locus displaced a first peripheral distance in a first direction along said periphery from said respective feed structure; said first deviation structure extending to a first return distance from said first deviation locus toward said respective feed structure; said first return distance being sufficient to establish signal coupling between said first deviation structure and said respective feed structure.

10. An electromagnetic antenna apparatus as recited in claim 9 wherein said selected frequency has a selected wavelength and wherein said first peripheral distance plus said first return distance substantially approximates one-half said selected wavelength.

11. An electromagnetic antenna apparatus as recited in claim 9 wherein said discontinuity structure further includes a second deviation structure interrupting said periphery at a second deviation locus displaced a second peripheral distance in a second direction along said periphery from said respective feed structure; said second deviation structure extending to a second return distance from said second deviation locus toward said respective feed structure; said second return distance being sufficient to establish signal coupling between said second deviation structure and said respective feed structure.

12. An electromagnetic antenna apparatus as recited in claim 11 wherein said selected frequency has a selected wavelength and wherein said second peripheral distance plus said second return distance substantially approximates one-half said selected wavelength.

13. An electromagnetic antenna apparatus as recited in claim 8 wherein said at least one selected antenna transceiving element has a substantially elliptical shape defined by said periphery having a peripheral length; said elliptical shape being oriented substantially symmetrically with respect to a major axis and a minor axis perpendicular with said major axis; said discontinuity structure including a material-free zone within said periphery; said material-free zone being delineated by a first border having a first edge length and a second border having a second edge length greater than said first edge length and less than said peripheral length; said first border and said second border meeting at a pair of termini; each terminus of said pair of termini being situated sufficiently near said respective feed structure to establish signal coupling between said deviation structure and said respective feed region.

14. An electromagnetic antenna apparatus as recited in claim 13 wherein said frequency region is bounded by a lower frequency having a longer wavelength and by a higher frequency having a shorter wavelength; and wherein said first edge length approximates one-half said shorter wavelength and said second edge length approximates one-half said longer wavelength.

15. An antenna apparatus for transceiving electromagnetic signals; the apparatus exhibiting a generally continuous signal response between a first frequency and a second frequency; the apparatus exhibiting a deviation from said signal response in at least one frequency region; each respective frequency region of said at least one frequency region being centered substantially at a respective selected frequency between said first frequency and said second frequency; the apparatus comprising:

(a) at least one substantially planar substantially plate-like transceiving element having a periphery;

(b) at least one feed structure; each respective said at least one transceiving element transferring said electromagnetic signals via a respective feed structure of said at least one feed structure;

(c) at least one selected transceiving element of said at least one transceiving element including a discontinuity structure in said periphery; said discontinuity structure being connected with said respective feed structure for effecting return of selected said transceiving signals to said respective feed structure as return signals; said return signals effecting said deviation.

16. An antenna apparatus for transceiving electromagnetic signals as recited in claim 15 wherein said at least one selected transceiving element has a polygonal shape defined by said periphery; said polygonal shape being generally symmetric about an axis; said axis intersecting said respective feed structure; said discontinuity structure establishing a plurality of material free zones in said polygonal shape; said plurality of material free zones being arranged substantially symmetrically with respect to said axis; each respective material free zone interrupting said periphery at a respective deviation locus displaced a respective deviation distance along said periphery from said respective feed structure; each said respective material free zone extending a respective return distance from said respective deviation locus toward said respective feed structure; said respective return distance being sufficient to establish signal coupling between said respective deviation structure and said respective feed structure.

17. An antenna apparatus for transceiving electromagnetic signals as recited in claim 16 wherein each said respective selected frequency has a respective selected wavelength and wherein said respective peripheral distance plus said respective return distance substantially approximates one-half of a respective selected wavelength.

18. An antenna apparatus for transceiving electromagnetic signals as recited in claim 15 wherein said at least one selected antenna transceiving element has a substantially elliptical shape defined by said periphery having a peripheral length; said elliptical shape being oriented substantially symmetrically with respect to a major axis and a minor axis perpendicular with said major axis; said discontinuity structure including a material-free zone within said periphery; said material-free zone being bounded by a first border having a first edge length and a second border having a second edge length; said second edge length being greater than said first edge length and less than said peripheral length; said first border and said second border meeting at a pair of termini; each terminus of said pair of termini being situated sufficiently near said respective feed structure to establish signal coupling between said deviation structure and said respective feed region.

19. An electromagnetic antenna apparatus as recited in claim 18 wherein said frequency region is bounded by a lower frequency having a longer wavelength and by a higher frequency having a shorter wavelength; and wherein said first edge length approximates one-half said shorter wavelength and said second edge length approximates one-half said longer wavelength.

20. An electromagnetic antenna apparatus; the apparatus exhibiting a generally continuous signal response between a first frequency and a second frequency; the apparatus exhibiting a deviation from said signal response in a frequency region centered substantially at a selected frequency between said first frequency and said second frequency; the apparatus comprising:

(a) a substantially planar antenna transceiving element;

(b) a feed structure; said feed structure being coupled with said antenna transceiving element for communicating transceiving signals with said antenna transceiving element; and (c) a discontinuity structure in said antenna transceiving element; said discontinuity structure being connected with said feed structure; said discontinuity structure being configured for effecting return of selected said transceiving signals to said feed structure as return signals; said return signals effecting said deviation; said antenna transceiving element having a polygonal shape defined by a periphery; said discontinuity structure including a first deviation structure interrupting said periphery at a first deviation locus displaced a first peripheral distance in a first direction along said periphery from said feed structure; said first deviation structure extending to a first return distance from said first deviation locus toward said feed structure; said first return distance being sufficient to establish signal coupling between said first deviation structure and said feed structure; said first peripheral distance plus said first return distance substantially approximating one-half said selected wavelength.

21. An electromagnetic antenna apparatus; the apparatus exhibiting a generally continuous signal response between a first frequency and a second frequency; the apparatus exhibiting a deviation from said signal response in a frequency region centered substantially at a selected frequency between said first frequency and said second frequency; the apparatus comprising:

(a) at least one substantially planar antenna transceiving element;

(b) a feed structure for each respective antenna transceiving element of said at least one antenna transceiving element; transceiving signals being communicated with each said respective antenna transceiving element via a respective said feed structure;

(c) a discontinuity structure in at least one selected antenna transceiving element of said respective antenna transceiving element; said discontinuity structure being connected with said respective feed structure for said at least one selected antenna transceiving element; said discontinuity structure being configured for effecting return of selected said transceiving signals to said respective feed structure as return signals; said return signals effecting said deviation; said at least one selected antenna transceiving element having a polygonal shape defined by a periphery; said discontinuity structure including a first deviation structure interrupting said periphery at a first deviation locus displaced a first peripheral distance in a first direction along said periphery from said respective feed structure; said first deviation structure extending to a first return distance from said first deviation locus toward said respective feed structure; said first return distance being sufficient to establish signal coupling between said first deviation structure and said respective feed structure; said selected frequency having a selected wavelength; said first peripheral distance plus said first return distance substantially approximating one-half said selected wavelength.

22. An antenna apparatus for transceiving electromagnetic signals; the apparatus exhibiting a generally continuous signal response between a first frequency and a second frequency; the apparatus exhibiting a deviation from said signal response in at least one frequency region; each respective frequency region of said at least one frequency region being centered substantially at a respective selected frequency between said first frequency and said second frequency; the apparatus comprising:

(a) at least one substantially planar transceiving element;

(b) at least one feed structure; each respective said at least one transceiving element transferring said electromagnetic signals via a respective feed structure of said at least one feed structure;

(c) at least one selected transceiving element of said at least one transceiving element including a discontinuity structure; said discontinuity structure being connected with said respective feed structure for effecting return of selected said transceiving signals to said respective feed structure as return signals; said return signals effecting said deviation; said at least one selected transceiving element having a polygonal shape defined by a periphery; said polygonal shape being generally symmetric about an axis; said axis intersecting said respective feed structure; said discontinuity structure comprising a plurality of material free zones in said polygonal shape; said plurality of material free zones being arranged substantially symmetrically with respect to said axis; each respective material free zone interrupting said periphery at a respective deviation locus displaced a respective deviation distance along said periphery from said respective feed structure; each said respective material free zone extending a respective return distance from said respective deviation locus toward said respective feed structure; said respective return distance being sufficient to establish signal coupling between said respective deviation structure and said respective feed structure; each said respective selected frequency having a respective selected wavelength; said respective peripheral distance plus said respective return distance substantially approximating one-half of a respective selected wavelength.

* * * * *